Oct. 8, 1940.        E. F. LOWEKE        2,216,848
BRAKE
Filed Oct. 5, 1938

INVENTOR.
ERWIN F. LOWEKE
BY
ATTORNEY.

Patented Oct. 8, 1940

2,216,848

UNITED STATES PATENT OFFICE 2,216,848

BRAKE

Erwin F. Loweke, Detroit, Mich., assignor to Hydraulic Brake Company, Detroit, Mich., a corporation of California Application October 5, 1938, Serial No. 233,469

4 Claims. (Cl. 188—152)

This invention relates to fluid pressure actuated brakes, and more particularly to fluid pressure actuated motors for brakes.

An object of the invention is to provide a brake of the internal expanding type with an actuating means for the friction elements thereof operative to increase the efficiency of the brake.

Another object of the invention is to provide a brake structure of the internal expanding type with a fluid pressure actuated motor for moving the friction elements into drum engagement and to control the friction elements so that inherent distortion of the drum, due to greater efficiency of the forward braking element over the reverse braking element, may be utilized to increase the efficiency of the brake as a whole.

Other objects and advantages of the invention will appear from the following description taken in connection with the drawing forming a part of this specification, and in which—

Figure 1:
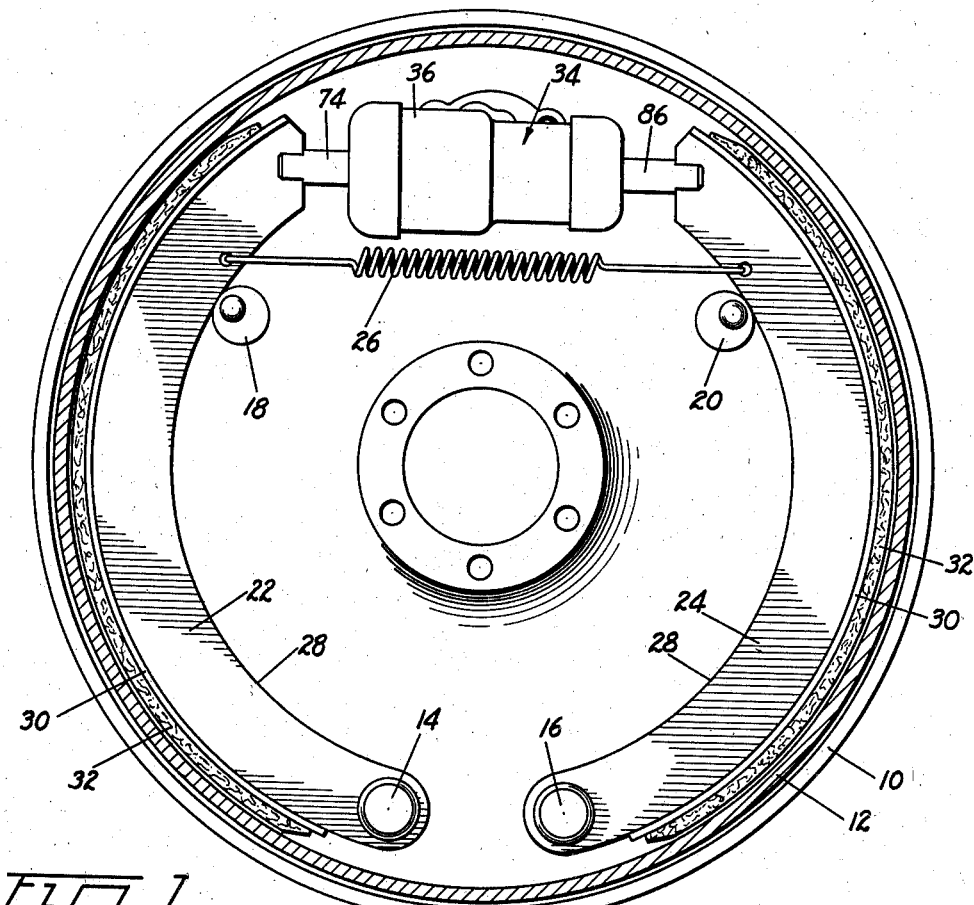
Fig. 1 is a vertical sectional view of a brake embodying the invention.
Figure 2:
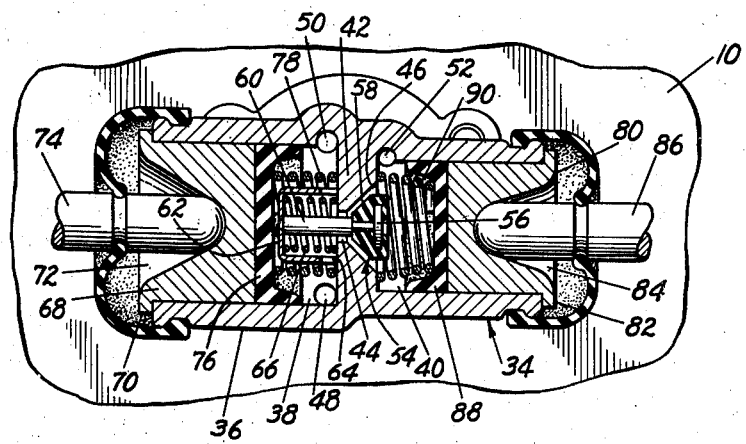
Fig. 2 is a longitudinal sectional view of the fluid pressure actuated motor.

Referring to the drawing for more specific details of the invention, 10 represents a fixed support or backing plate adapted to be secured to an axle or to an axle housing, and associated with the backing plate is a rotatable drum 12 adapted to be secured to a wheel.

The backing plate has thereon spaced anchors 14 and 16, and adjustable retractile stops 18 and 20. A pair of corresponding frictional elements or shoes 22 and 24 have their articulate ends pivotally mounted on the anchors 14 and 16, and a retractile spring 26 connects the shoes adjacent their unanchored or force-applying ends. The shoes are of conventional type, each including a web 28 supporting a rim 30 having secured thereon a lining 32 for frictionally engaging the drum 12. The spring serves to return the shoes upon conclusion of a braking operation to retracted position and to normally retain them against the stops.

A fluid pressure actuated motor 34 mounted on the backing plate 10 and connected to the force-applying ends of the shoes is operative to actuate the shoes into engagement with the drum 12 against the resistance of the retractile spring 26.

The structure thus far described is that of a conventional fluid pressure actuated brake. In brake structures of this and other types of internal expanding brakes, heat generated in the brake during a prolonged or heavy braking operation generally expands the drum. Due to greater braking efficiency of the forward braking element or shoe, the drum is slightly distorted. This is more pronounced when the drum is in a heated state. The present invention aims to utilize this inherent action of the drum to increase the efficiency of the brake by the provision of a fluid pressure actuated motor hereinafter fully described.

As shown, the motor includes a cylinder 36 having a large chamber 38 and a relatively small chamber 40 arranged in axial alignment to one another and separated as by a diaphragm 42 having a concentric opening 44 providing a communication between the chambers and a valve seat 46 coextensive with the perimeter defining the opening, the valve seat facing the interior of the small chamber. The large chamber has a port 48 adapted to be connected to a suitable source of fluid pressure, and a port 50 normally closed as by a conventional bleeder screw, and, correspondingly, the small chamber has a port 52, also normally closed as by a conventional bleeder screw.

The communication 44 between the large and small chambers is controlled by a valve 54. This valve includes a head 56 having thereon a rubber jacket 58 complementary to the valve seat 46 so as to more effectively seal the valve when in closed position. A stem 60 formed integral with the head 56 extends through the opening 44 in the diaphragm, and suitably attached to the free end of the stem is a shell 62 provided with a plurality of spaced slots 64 in the open end of the shell, and a spring 66 interposed between the head of the shell and the diaphragm serves to urge the valve to its seat.

A piston 68 reciprocable in the large chamber 38 has a flange 70 adapted to abut the cylinder so as to determine the retracted position of the piston. The piston also has a recess 72 in its back for the reception of one end of a thrust pin 74, the other end of which is connected to the forward braking shoe 22, and seated on the head of the piston is a sealing cup 76 held against displacement by a spring 78 interposed between the cup and the diaphragm 42.

Correspondingly, a piston 80 reciprocable in the small chamber 40 has a flange 82 adapted to abut the other end of the cylinder so as to fix the retracted position of the piston. This piston also has a recess 84 in its back for the reception of one end of a thrust pin 86, the other end of which is suitably connected to the reverse or trailing brake shoe 24, and a sealing cup 88 seated on the head of the piston is held against displacement by a spring 90 interposed between the cup and the diaphragm 42.

In an operation of the brake, the valve 54 is normally held open by the piston 68, hence when fluid under pressure enters the large chamber 38 and the small chamber 40 the pistons 68 and 80 are actuated in unison and this movement of the pistons actuates the shoes 22 and 24 into engagement with the drum 12. During this period of the operation, the valve 54 moves to its seat 46 as the piston 68 advances on its compression stroke, so as to shut off communication between the chambers 38 and 40 simultaneously with an effective braking application.

Because of this closing of the valve 54, the fluid under pressure in the small chamber 40 is trapped, and accordingly retains the piston 80 against movement toward its retracted position, hence the reverse braking shoe 24 is likewise held against movement toward its retracted position. Under this condition, any tendency of the drum 12 to distort due to the action of the forward braking shoe is effectively checked and utilized to increase the effectiveness of the brake as a whole.

Upon conclusion of a braking operation and release of pressure on the fluid in the large chamber 38, the piston 68 and the forward braking shoe 22 move to their respective retracted positions under the influence of the retractile spring 26. As this piston moves to its retracted position, it opens the valve 54 so as to release the pressure on the fluid in the small chamber 40, and upon this release of pressure on the fluid in the chamber 40, the piston 80 and the reverse braking shoe 24 move to their respective retracted positions under the influence of the retractile spring 26.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A brake comprising a motor including a cylinder having a large chamber and a small chamber, a piston reciprocable in each of the chambers, and a valve controlling the communication between the chambers operative to close the communication upon advance of the piston in the large chamber and to open the communication upon retraction of the piston in the large chamber.

2. A brake comprising a fixed support, a rotatable drum associated therewith, friction elements mounted on the support for cooperation with the drum, a motor on the support including a cylinder having a large chamber and a small chamber, a piston movable in each of the chambers connected respectively to the friction elements, and a valve for control of a communication between the chambers operative to close the communication upon advance of the piston in the large chamber and to open the communication upon retraction of the piston in the large chamber.

3. A brake comprising a fixed support, a rotatable drum associated therewith, forward and reverse braking shoes mounted on the support for cooperation with the drum, a motor mounted on the support including a large chamber and a small chamber communicating with one another, a piston movable in the large chamber connected to the forward braking shoe, a piston movable in the small chamber connected to the reverse braking shoe, and a valve for the communication controlled by the piston in the large chamber.

4. A brake comprising a fixed support, a rotatable drum associated therewith, forward and reverse braking shoes mounted on the support for cooperation with the drum, a motor mounted on the support between the shoes including a cylinder having a large chamber and a small chamber, a diaphragm between the chambers having an opening providing a communication between the chambers, a piston movable in the large chamber connected to the forward braking shoe, a piston movable in the small chamber connected to the reverse braking shoe, and a loaded valve for the communication between the chambers controlled by the piston in the large chamber.

ERWIN F. LOWEKE.